US012692087B2

(12) United States Patent
Johannsen

(10) Patent No.: US 12,692,087 B2
(45) Date of Patent: Jul. 28, 2026

(54) CARRIAGELESS STOCKPILING CONVEYOR

(71) Applicant: Thor Global Enterprises Ltd., Mississauga (CA)

(72) Inventor: Thorkil Johannsen, Mississauga (CA)

(73) Assignee: Thor Global Enterprises Ltd., Mississauga (CA)

(*) Notice: Subject to any disclaimer, the term of this patent is extended or adjusted under 35 U.S.C. 154(b) by 42 days.

(21) Appl. No.: 19/018,653

(22) Filed: Jan. 13, 2025

(65) Prior Publication Data

US 2025/0145382 A1      May 8, 2025

Related U.S. Application Data

(63) Continuation of application No. 17/956,086, filed on Sep. 29, 2022, now Pat. No. 12,214,967.

(51) Int. Cl.
B65G 41/00 (2006.01)

(52) U.S. Cl.
CPC ......... B65G 41/002 (2013.01); B65G 41/008 (2013.01); *B65G 2201/04* (2013.01); *B65G 2814/0326* (2013.01)

(58) Field of Classification Search
CPC ................ B65G 41/002; B65G 41/008; B65G 2201/04; B65G 2814/0326; B65G 3/02
See application file for complete search history.

(56) References Cited

U.S. PATENT DOCUMENTS 3,616,893 A      11/1971  Knadle et al.
6,126,738 A  *  10/2000  Gerbus ................. C04B 18/021
                                                                106/799
(Continued)

FOREIGN PATENT DOCUMENTS

CA          2276833 A1  *  5/2000  ........... B65G 41/008
CA          2401189 A1  *  3/2004
(Continued)

OTHER PUBLICATIONS

IPSearch History Apr. 16, 2026 UTC; InnovationQ+; https://iq.ip.com/discover (Year: 2026).*

(Continued)

*Primary Examiner* — Gene O Crawford
*Assistant Examiner* — Abby A Jorgensen
(74) *Attorney, Agent, or Firm* — Jacob M. Ward; Ward Law Office LLC

(57)                    ABSTRACT

An apparatus for creating a stockpile of bulk material, comprising a conveyor having a feed end and a distribution end; a stabilizer at the feed end of the conveyor; and a support at the distribution end of the conveyor; wherein the support includes a primary hydraulic cylinder having a base portion connected to the support and an end portion which extends and retracts longitudinally to alter the angle between the conveyor and the ground; and a secondary hydraulic cylinder having one end connected to the support and the other end connected to the primary hydraulic cylinder, where the secondary hydraulic cylinder extends and retracts in a lateral direction, thus pivoting the primary hydraulic cylinder against the support. This design is simpler and less expensive than a conveyor with an undercarriage and makes for a smaller staging area as room for the undercarriage is unnecessary.

18 Claims, 4 Drawing Sheets

(56)          References Cited

U.S. PATENT DOCUMENTS

| | | | | |
|---|---|---|---|---|
| 8,397,902 | B1 * | 3/2013 | Geraets ............. | B65G 69/0466 |
| | | | | 198/300 |
| 10,138,071 | B1 * | 11/2018 | McCloskey .......... | B65G 41/002 |
| 10,920,434 | B1 * | 2/2021 | Pearson, Jr. ............ | E04G 21/22 |
| 2015/0353291 | A1 | 12/2015 | Teichrob et al. | |
| 2016/0207715 | A1 * | 7/2016 | Allensworth ........ | B65G 41/002 |
| 2017/0274811 | A1 * | 9/2017 | Esch .................... | B65G 41/008 |
| 2019/0112132 | A1 * | 4/2019 | McCloskey ............ | B65G 19/04 |
| 2021/0189747 | A1 * | 6/2021 | Pearson, Jr. ............. | B25J 5/007 |

FOREIGN PATENT DOCUMENTS

| | | | | | |
|---|---|---|---|---|---|
| CA | 3177933 | A1 * | 3/2024 | ............. | B65G 65/28 |
| CN | 106477271 | A | 1/2019 | | |
| CN | 210593737 | | 5/2020 | | |
| JP | 2010075798 | A * | 4/2010 | | |
| WO | WO-9737777 | A1 * | 10/1997 | ............. | B07B 13/16 |
| WO | WO-2006120299 | A1 * | 11/2006 | ............. | B02C 23/02 |

OTHER PUBLICATIONS

Canadian Office Action for CA Patent Application No. 3, 177,933, mailed May 3, 2024, 7 pages.

\* cited by examiner

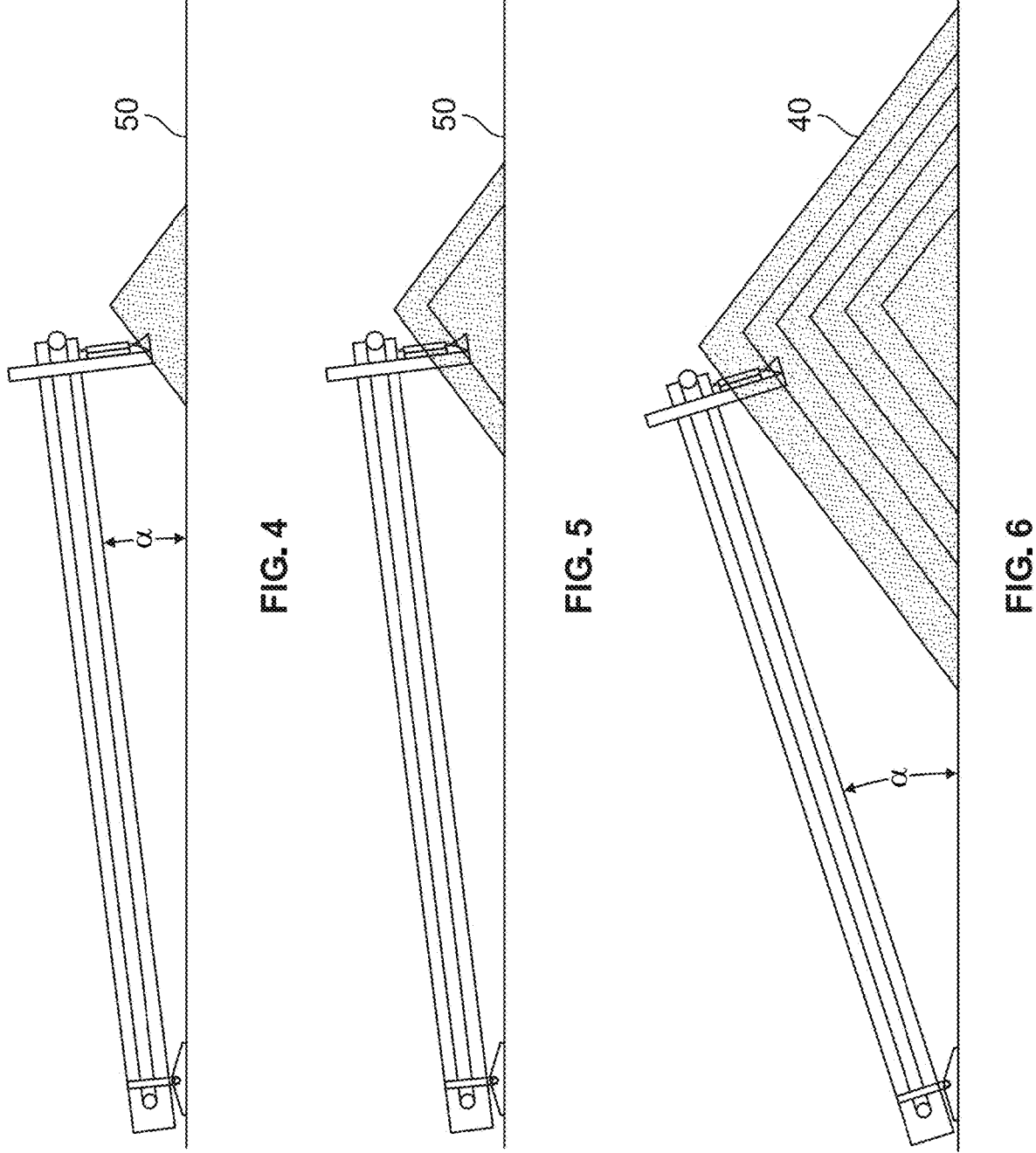

CARRIAGELESS STOCKPILING CONVEYOR

CROSS-REFERENCE TO RELATED APPLICATIONS

This application is a Continuation of U.S. Ser. No. 17/956,086 filed Sep. 29, 2022, the entire disclosure of which is hereby incorporated by reference and relied upon.

BACKGROUND OF THE INVENTION

Field of the Invention

The present invention relates to equipment for stockpiling bulk material; specifically, a cost-effective apparatus that is able to "climb" the stockpile as it is being formed.

Description of Related Art

A stockpile is a pile or storage location for bulk materials, forming part of the bulk material handling process. The stockpile is normally created by a stockpiling conveyor (or stacker). Stockpiles are normally stacked in stockyards in refineries, ports and mine sites.

As can be seen in FIG. 1, a traditional stockpiling conveyor (10) utilizes an undercarriage frame (12) or fixed structural supports having an extendable support (14) to raise the conveyor to desired height and lay the stockpile (16) below.

Stockpiling conveyors can also travel on a rail between stockpiles in the stockyard. This allows it to typically move in at least two directions: horizontally along the rail and vertically by luffing (raising and lowering) its boom. Luffing of the boom minimizes dust by reducing the distance that material such as coal needs to fall to the top of the stockpile. The boom is luffed upwards as the height of the stockpile increases. Some stockpiling conveyors can rotate the boom. This allows a single stockpiling conveyor to form two stockpiles, one on either side of the conveyor.

U.S. Pat. No. 6,126,738 an inclined conveyor is shown that may be inclined at a climb angle B of about 22 degrees with respect to the ground. The inclined conveyor is pivoted on a support at a first end, near the horizontal conveyor. A movable frame with a support tower is provided for support for elevating or inclining the inclined conveyor. The wet mixture is dropped from height to the base surface to form one or more conical piles. In the embodiment the radial stacker is preferably stepped through a horizontal arc to form multiple overlapping piles.

Japanese Patent Application No. JP2010075798A discloses a self-travelling processing machine. The self-travelling machine comprises of a processing unit for processing matters, a discharge conveyor that transports objects and discharges them, a plurality of non-contact type sensors installed in the discharge conveyor. The sensors are used to measure height at each different measuring point of a slope on the same side as the heap. The plurality of sensors help calculate the height and angle of repose and the vertex. The peak position is used to calculate the volume of the processing operation.

There still remains a need for a more cost-effective apparatus, one that is less expensive and more portable. There also remains a need for a stockpiling conveyor which can create large stockpiles within a smaller staging area.

BRIEF SUMMARY OF THE INVENTION

The present invention features a design with no undercarriage. It utilizes the stockpile of material it has already deposited as a support and climbs (walks) on top of that stockpile to raise itself and deposit more stockpile. In this regard, a hydraulic ram at the distribution end operates in conjunction with the support to jack the support in an incremental ratcheting fashion as the stockpile gets higher.

The present invention is directed to an apparatus for creating a stockpile of bulk material, the apparatus comprising a conveyor portion having a feed end and a distribution end; a stabilizer at the feed end of the conveyor for temporarily fixing the conveyor portion to the ground, creating an angle between the conveyor portion and the ground; and a support at the distribution end of the conveyor portion; wherein the support includes a primary hydraulic cylinder having a base portion connected to the support and an end portion which extends and retracts in a longitudinal direction to alter the angle between the conveyor portion and the ground; and a secondary hydraulic cylinder having one end connected to the support and the other end connected to the primary hydraulic cylinder, where the secondary hydraulic cylinder extends and retracts in a lateral direction, thus pivoting the primary hydraulic cylinder against the support.

In one embodiment, the primary hydraulic cylinder extends and retracts in a longitudinal direction until the angle between the conveyor portion and the ground reaches a maximum of 18° to 20°.

As a further option, the conveyor portion may include a cleated belt allowing for the angle between the conveyor and the ground to reach approximately 25°.

Preferably, the stabilizer includes at least one outrigger for translatable movement of the feed end of the conveyor in the lateral direction of the secondary hydraulic cylinder. This allows the stockpiling conveyor to be used to make rows of deposited material, not just conical piles, which more efficiently utilizes the stockpile area.

In one embodiment the conveyor portion is foldable, allowing the apparatus to be containerized for ease of transport. Alternatively to being containerized, the conveyor portion may include a removeable or retractable wheel assembly, allowing for the apparatus to be towed.

The present invention is also directed to a method of creating a stockpile of bulk material, the method including the steps of:

a. feeding the bulk material into a first end of a conveyor portion, the bulk material then travels along a length of the conveyor portion and off of a second end of the conveyor portion, which then creates the stockpile;

b. activating a ratcheting cylinder having a base portion connected to the conveyor portion, and a foot portion which extends and retracts in a longitudinal direction;

c. raising the second end of the conveyor portion in a ratcheting fashion with the foot portion acting against the stockpile;

d. supporting the conveyor portion against the stockpile with a support, the support being the connection means between the ratcheting cylinder and the conveyor portion;

e. repeating steps b-d until a desired stockpile height is reached;

f. pivoting the ratcheting cylinder such that the extension of the foot portion translates the second end of the conveyor portion laterally relative to the stockpile;

g. retracting the foot portion to lower the support down one side of the stockpile; and h. repeating steps f-g until the support rests upon the ground at the base of the stockpile.

The inventive stockpiling conveyor is simpler and less expensive to make than a traditional stockpiling conveyor with an undercarriage. Smaller hydraulic ram(s) are (is) required. The present invention also makes for a smaller staging area as room for the undercarriage is unnecessary as the stockpile can be distributed closer to the tail (feed) end. Furthermore, the inventive stockpiling conveyor can be used to make rows of deposited material, not just conical piles, which more efficiently utilizes the stockpile area.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 4 shows the conveyor of FIG. 3, after extending through the stockpile material.

FIG. 5 shows the conveyor of FIG. 4, as the conical stockpile grows larger.

FIG. 6 shows the conveyor of the present invention at its maximum conveying angle.

DETAILED DESCRIPTION OF THE INVENTION

Figures 1, 2, 3:
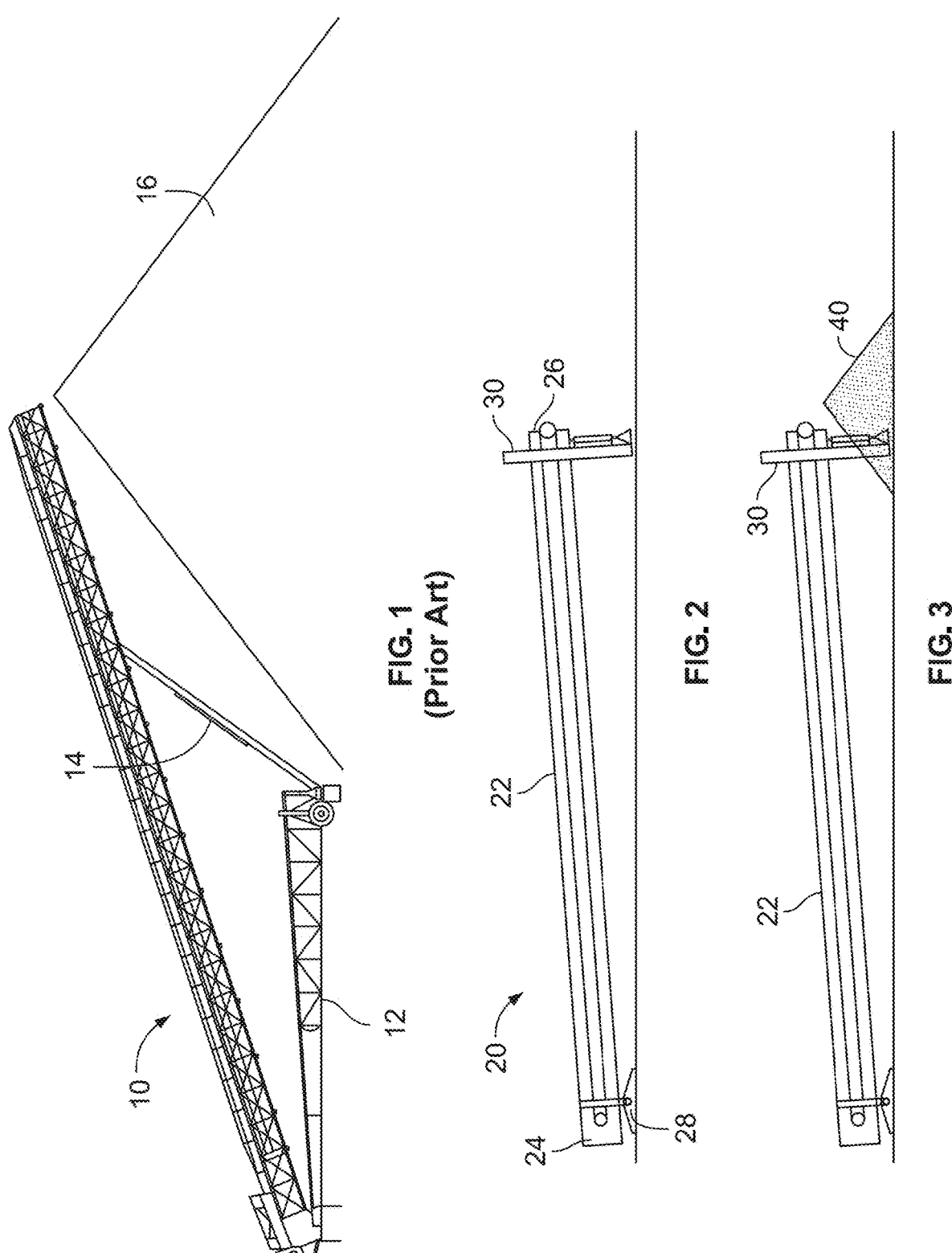
FIG. 1 shows a traditional stockpiling conveyor with an undercarriage.
FIG. 2 shows the stockpiling conveyor of the present invention.
FIG. 3 shows the stockpiling conveyor of the present invention as it starts to create a conical stockpile.

Referring to the figures, wherein like numerals indicate like or corresponding parts throughout the several views, FIGS. 2-6 show the stockpiling conveyor apparatus 20 of the present invention. It features a conveyor portion 22 having a feed end 24 and a distribution end 26. Stability at the feed end 24 is provided by a stabilizer 28. This stabilizer 28 can be in the form of a large ground plate or bar, which allows for pivoting and incline movement of the conveyor portion 22, but prevents translation or twisting movement. At the distribution end 26 of the conveyor portion 22 is a support 30, which initially rests upon the ground 50.

Figure 7:
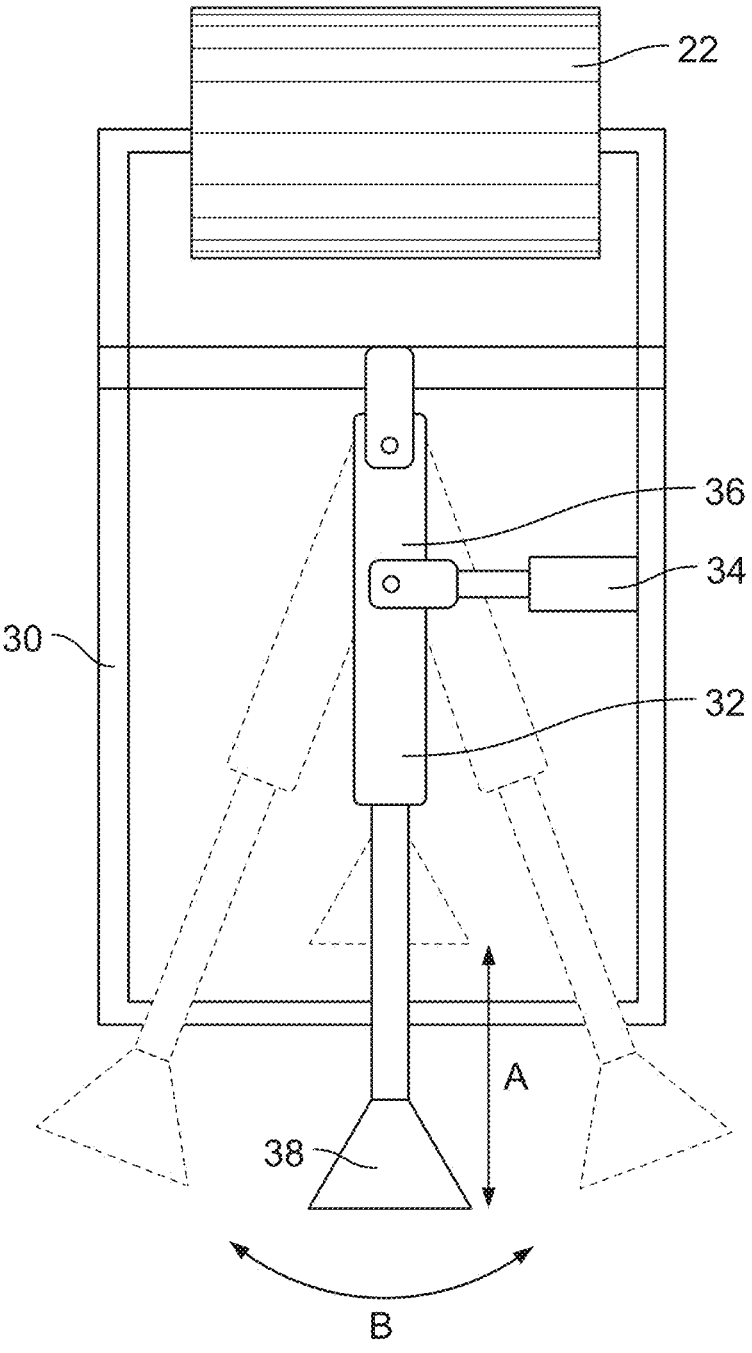
FIG. 7 shows an end view of the stockpiling conveyor of the present invention.

As can best be seen in FIG. 7, the support 30 includes a primary hydraulic cylinder 32 and a secondary hydraulic cylinder 36. The primary hydraulic cylinder 32 is connected to the support 30 at a base portion 36. An end portion 38 of the primary hydraulic cylinder 32 is able to extend and retract in longitudinal direction A.

The secondary hydraulic cylinder 36 is connected at one end to the support 30, with the other end being connected near the middle of the primary hydraulic cylinder 32. Therefore, as shown in FIG. 7, as the secondary hydraulic cylinder 36 extends and retracts, the primary hydraulic cylinder 32 pivots against the support 30 in direction B.

In use, the stockpiling operation would start with the stockpiling conveyor apparatus 20 in its lowest position, with the support 30 resting against the ground (FIG. 2). The deposition of the material creates a conical stockpile 40 at the distribution end 26 of the conveyor portion 22. As the material stockpile raises up to maximum height under the conveyor apparatus 20, the stockpile 40 starts to bury the support 30 under the material (FIG. 3).

The distribution end 26 is then raised in a ratcheting fashion by contracting the primary hydraulic cylinder 32 and then extending it.

During contraction, the primary hydraulic cylinder end portion 38 pulls through the stockpile material, with the support 30 acting against the stockpile.

During subsequent extension, the primary hydraulic cylinder end portion 38 acts against the stockpile material, raising the support 30, thus ratcheting the distribution end 26 higher atop the stockpile 40 it has already created (FIG. 4). FIG. 7 shows direction A of the movement of the primary hydraulic cylinder end portion 38. This increases the angle (α) between the conveyor portion 22 and the ground 50, giving the equipment more height to deposit further material above the stockpile 40.

The contraction and extension motion of the primary hydraulic cylinder end portion 38 in direction A are repeated until the angle (α) reaches its maximum (as seen in FIGS. 5-6). This maximum angle (α) is typically around 18° to 20°, although if a cleated belt is used on the conveyor portion 22, the maximum of the angle (α) could be up to approximately 25°, depending on the type of bulk material.

As shown in FIG. 7, once the maximum height of the stockpile 40 is achieved, the secondary hydraulic cylinder 34 extends, pivoting the primary hydraulic cylinder 32 along direction B, thus pushing the distribution end 26 of the conveyor portion laterally. This lateral/translational movement of the distribution end 26 lowers the support 30 down the side of the stockpile 40. As the primary hydraulic cylinder end portion 38 continues to extend and retract in a lateral direction, the conveyor apparatus is able to slowly climb or "step" down the side of the conical stockpile 40.

In one embodiment, the stabilizer 28 at the feed end 24 of the conveyor portion 22 includes elements such as outriggers (not shown), which enable translational movement of the feed end 24 of the conveyor portion 22. The translational movement of the feed end 24, combined with the above-mentioned translational movement of the support 30 at the distribution end 26, allows for the entire stockpiling conveyor apparatus 20 to move in a lateral direction. After repeated operations, this results in a row of stockpile material, rather than a single conical pile.

Figures 8, 9:
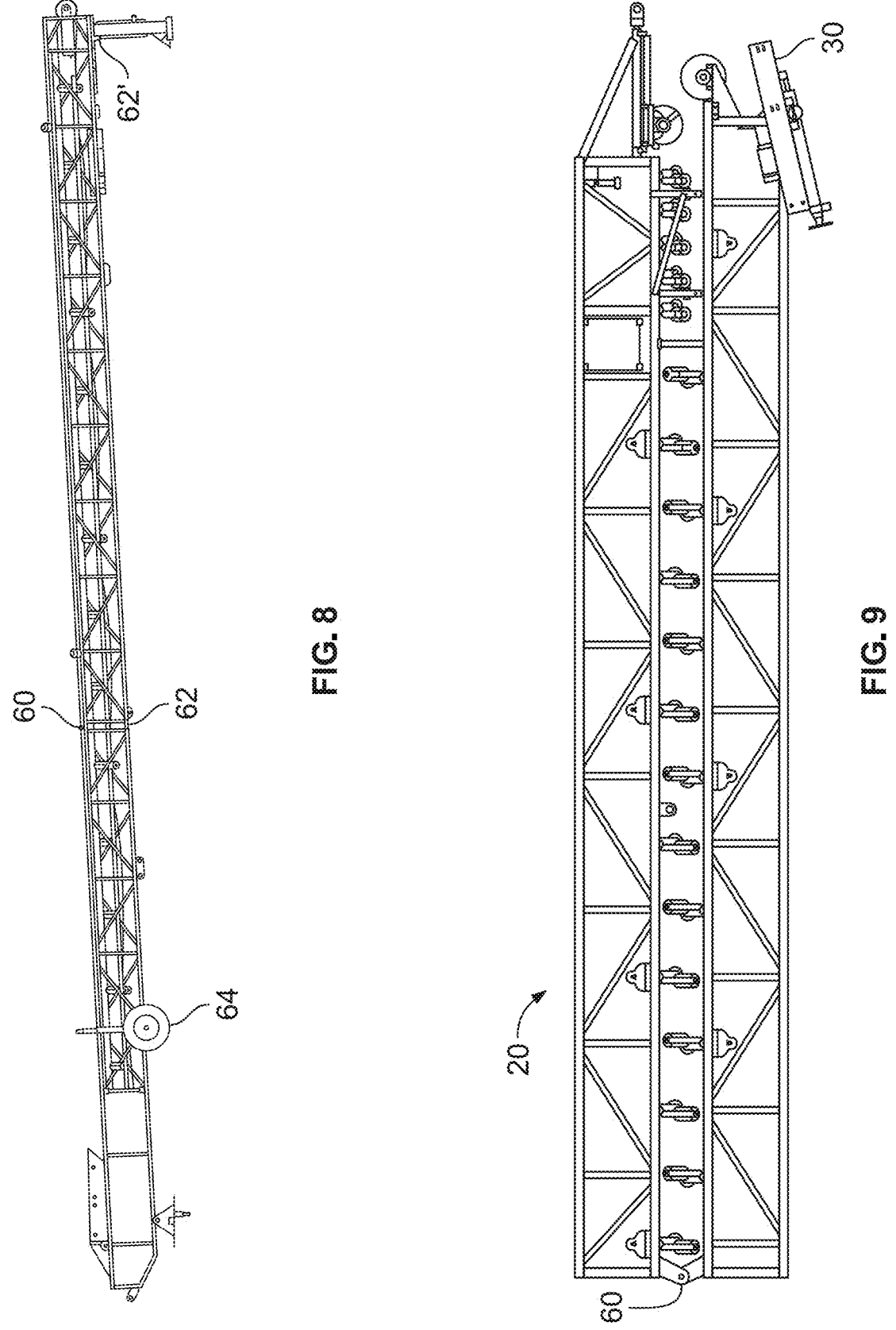
FIG. 8 shows the present invention including optional elements.
FIG. 9 shows the invention in a folded configuration.

FIGS. 8 and 9 show the present invention including multiple optional elements.

In one embodiment, where the conveyor apparatus 20 is foldable for ease of transport, the conveyor portion 22 includes a hinge 60 partway along its length. A locking bolt 62 is engaged during operation of the conveyor apparatus 20, and is removed to allow the conveyor portion 22 to be folded over. An additional locking bolt 62' can be located at the connection point of the conveyor portion 22 and the support 30. When the stockpiling conveyor apparatus 20 is not operational, one could remove the locking bolt 62', allowing the support 30 to be pivoted for transport. FIG. 9 shows the conveyor apparatus 20 in a folded position with the conveyor portion 22 folded over, and the support 30 pivoted for transport. Although a locking bolt 62, 62' is shown in the Figures, any type of locking/un-locking mechanism could be used in a similar manner. Once in the folded position, the conveyor apparatus 20 is easily containerized for transport.

Alternatively to containerizing the folded apparatus, the folded apparatus could be towed when in a folded position. As shown in FIG. 8, the stockpiling conveyor apparatus 22 may also include a removeable or retractable wheel assembly 64. This wheel assembly 64 would be removed or retracted during operation of the conveyor apparatus 20, but could then be attached or extended, allowing for the apparatus to be towed.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An apparatus for creating a stockpile of bulk material, the apparatus comprising:
a conveyor portion having a feed end and a distribution end;
a stabilizer at the feed end of the conveyor for limiting the movement of the feed end of the conveyor, and creating an angle between the conveyor portion and the ground; and
a support at the distribution end of the conveyor portion; the support includes an end portion; and
wherein the support is configured to raise the distribution end by:
raising the end portion away from the stockpile and closer to the conveyor apparatus, and during the raising of the end portion, the end portion is pulled through the stockpile, with the support acting against the stockpile; and
extending, after raising the end portion closer to the conveyor apparatus, the end portion away from the conveyor apparatus so that the end portion rests on the stockpile, and during subsequent extension, the end portion acts against the stockpile, raising the support, to move the distribution end higher atop the stockpile; and
whereby movement of the end portion increases the angle (α) between the conveyor portion and the ground, giving the conveyor apparatus more height to deposit further said bulk material above the stockpile.

2. The apparatus of claim 1, wherein the primary hydraulic cylinder extends and retracts in a longitudinal direction until the angle between the conveyor portion and the ground reaches a maximum of 18° to 20°.

3. The apparatus of claim 1, wherein the conveyor portion includes a cleated belt allowing for the angle between the conveyor portion and the ground to reach approximately 25°.

4. The apparatus of claim 1, wherein the stabilizer limits the movement of the feed end of the conveyor by preventing at least one of pivoting rotation and torsional rotation.

5. The apparatus of claim 1, wherein the conveyor portion includes a hinge and a removable locking pin, enabling the conveyor portion to be foldable.

6. The apparatus of claim 1, wherein the conveyor portion includes a removable or retractable wheel assembly.

7. The apparatus of claim 1, wherein:
the support includes:
a primary hydraulic cylinder having a base portion connected to the support and the end portion which extends and retracts in a longitudinal direction to alter the angle between the conveyor portion and the ground, thus translating the support longitudinally relative to the stockpile; and
a secondary hydraulic cylinder having one end connected to the support and the other end connected to the primary hydraulic cylinder, where the secondary hydraulic cylinder extends and retracts in a lateral direction, thus pivoting the primary hydraulic cylinder against the support and translating the support laterally relative to the stockpile.

8. The apparatus of claim 7, wherein:
the support is configured to raise the distribution end in a ratcheting fashion by:
contracting the primary hydraulic cylinder to raise the end portion away from the stockpile and closer to the conveyor apparatus, and during contraction of the primary hydraulic cylinder, the end portion pulls through the stockpile, with the support acting against the stockpile; and
extending the primary hydraulic cylinder, after raising the end portion closer to the conveyor apparatus, to extend the end portion away from the conveyor apparatus so that the end portion rests on the stockpile, and during subsequent extension, the end portion acts against the stockpile, raising the support, thus ratcheting the distribution end higher atop the stockpile; and
whereby movement of the end portion increases the angle (α) between the conveyor portion and the ground, giving the conveyor apparatus more height to deposit further said bulk material above the stockpile.

9. A method for creating a stockpile of bulk material by using (A) a conveyor portion having a feed end and a distribution end, (B) a stabilizer at the feed end of the conveyor for limiting the movement of the feed end of the conveyor, and creating an angle between the conveyor portion and the ground, and (C) a support at the distribution end of the conveyor portion, wherein the support includes an end portion, and wherein the support is configured to raise the distribution end, and the method comprising:
using the support to raise the distribution end by:
raising the end portion away from the stockpile and closer to the conveyor apparatus, and during the raising of the end portion, the end portion is pulled through the stockpile, with the support acting against the stockpile; and
extending, after raising the end portion closer to the conveyor apparatus, the end portion away from the conveyor apparatus so that the end portion rests on the stockpile, and during subsequent extension, the end portion acts against the stockpile, raising the support, to move the distribution end higher atop the stockpile; and
whereby movement of the end portion increases the angle (α) between the conveyor portion and the ground, giving the conveyor apparatus more height to deposit further said bulk material above the stockpile.

10. The method of claim 9, wherein the primary hydraulic cylinder extends and retracts in a longitudinal direction until the angle between the conveyor portion and the ground reaches a maximum of 18° to 20°.

11. The method of claim 9, wherein the conveyor portion includes a cleated belt allowing for the angle between the conveyor portion and the ground to reach approximately 25°.

12. The method of claim 9, wherein the stabilizer limits the movement of the feed end of the conveyor by preventing at least one of pivoting rotation and torsional rotation.

13. The method of claim 9, wherein the conveyor portion includes a hinge and a removable locking pin, enabling the conveyor portion to be foldable.

14. The method of claim 9, wherein the conveyor portion includes a removable or retractable wheel assembly.

15. The method of claim 9, wherein:

the support includes:

a primary hydraulic cylinder having a base portion connected to the support and the end portion which extends and retracts in a longitudinal direction to alter the angle between the conveyor portion and the ground, thus translating the support longitudinally relative to the stockpile; and a secondary hydraulic cylinder having one end connected to the support and the other end connected to the primary hydraulic cylinder, where the secondary hydraulic cylinder extends and retracts in a lateral direction, thus pivoting the primary hydraulic cylinder against the support and translating the support laterally relative to the stockpile.

16. The method of claim 15, wherein:

the support raises the distribution end in a ratcheting fashion by:

contracting the primary hydraulic cylinder to raise the end portion away from the stockpile and closer to the conveyor apparatus, and during contraction of the primary hydraulic cylinder, the end portion pulls through the stockpile, with the support acting against the stockpile; and extending the primary hydraulic cylinder, after raising the end portion closer to the conveyor apparatus, to extend the end portion away from the conveyor apparatus so that the end portion rests on the stockpile, and during subsequent extension, the end portion acts against the stockpile, raising the support, thus ratcheting the distribution end higher atop the stockpile; and whereby movement of the end portion increases the angle ($\alpha$) between the conveyor portion and the ground, giving the conveyor apparatus more height to deposit further said bulk material above the stockpile.

17. The apparatus of claim 7, wherein the stabilizer includes at least one outrigger for translatable movement of the feed end of the conveyor in the lateral direction of the secondary hydraulic cylinder.

18. The method of claim 15, wherein the stabilizer includes at least one outrigger for translatable movement of the feed end of the conveyor in the lateral direction of the secondary hydraulic cylinder.

* * * * *